2 Sheets-Sheet 1.
Sword & Tiffany,
Brick Machine.
No. 2,532. Reissued Mar. 26, 1867.
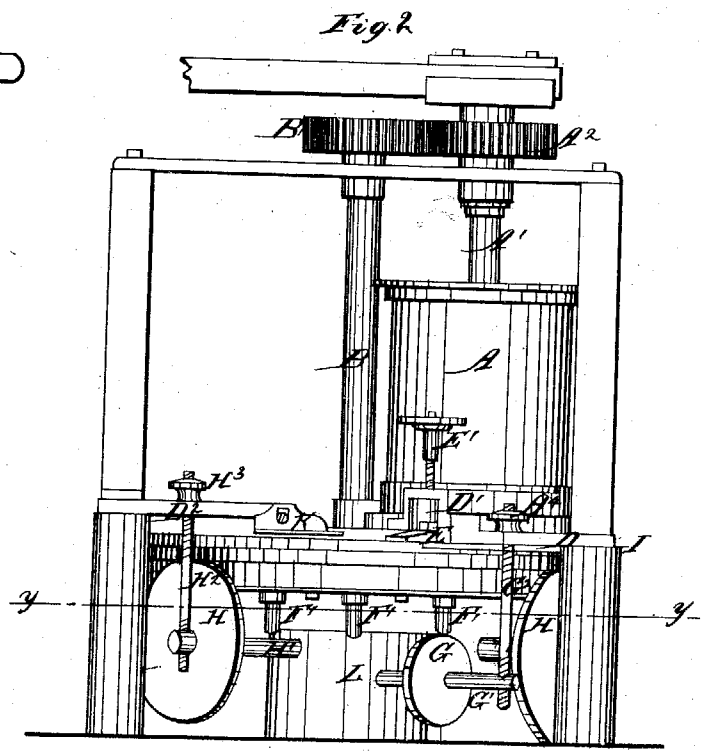
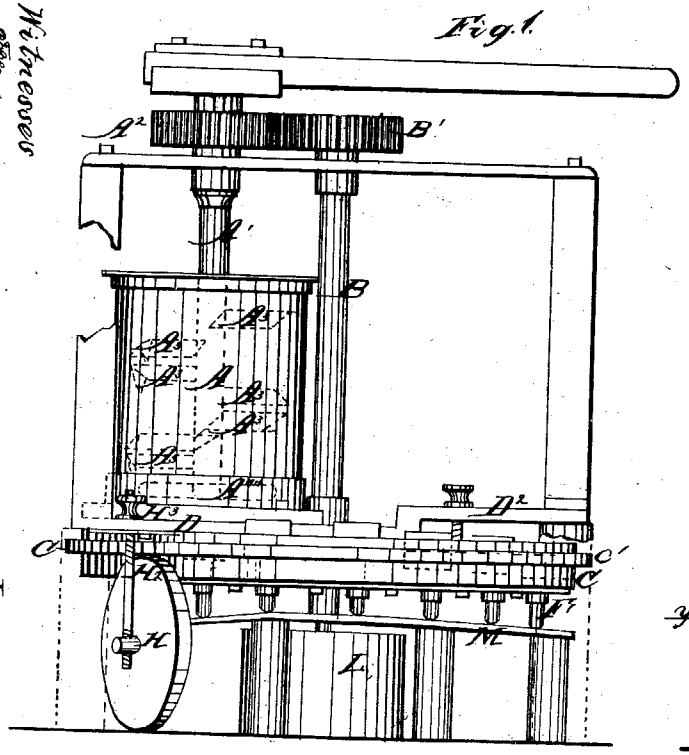
Witnesses
J. T. Pearson
Jno. D. Potter
Inventor.
Peter L. Sword &
Geo. P. Tiffany
by
D. P. McLowan Atty.

2 Sheets-Sheet 2.
Sword & Tiffany,
Brick Machine.
No. 2,532. Reissued Mar. 26, 1867.
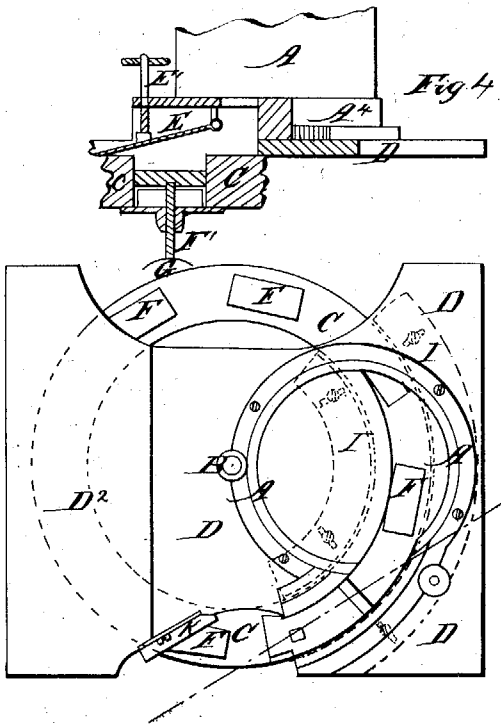
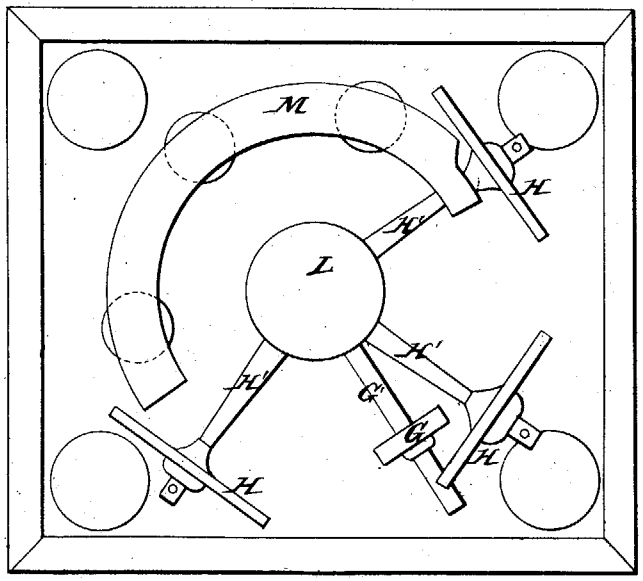
Witnesses
Geo. W. Allen
Jno. D. Rollins
Inventor.
Peter L. Sword &
Geo. O. Tiffany
by D. B. Holloway
Atty.

United States Patent Office.

PORTER L. SWORD, OF ADRIAN, MICHIGAN, ASSIGNEE BY MESNE ASSIGNMENTS OF HIMSELF AND GEORGE S. TIFFANY.

*Letters Patent No.* 43,162, *dated June* 14, 1864; *reissue No.* 2,532, *dated March* 26, 1867.

IMPROVED BRICK MACHINE.

The Schedule referred to in these Letters Patent and making part of the same.

TO WHOM IT MAY CONCERN:

Be it known that PORTER L. SWORD and GEORGE S. TIFFANY, of Adrian, in the county of Lenawee, and State of Michigan, invented a new and useful Improved Brick Machine; and I do hereby declare that the following is a full, clear, and exact description of the same, reference being had to the annexed drawings, making part of this specification, in which—

Figure 1 is an elevation, showing the side of the machine from which the completed bricks are removed.

Figure 2 is an elevation, showing the side of the machine on which the bricks are formed.

Figure 3 is a plan of the parts below the mould-wheel.

Figure 4 is a part of a vertical section through the line *x z z* in fig. 5.

Figure 5 is a horizontal section through line *y y*, fig. 2.

A is the pug-mill, for preparing and feeding the clay to the moulds. A set of knives are arranged upon the vertical shaft $A^1$, to which the power is communicated in any convenient manner. The knives or paddles $A'''$ have their faces so inclined as to work the clay downwards, the lower ones running in close proximity to the bottom formed by the bed-plate D, and presenting to the opening therein a face so inclined as to press the clay into the mould, which revolves immediately below the bed-plate. The spur-wheel $A^2$ on the pug-mill shaft $A^1$ drives the spur-wheel $B'$ on the shaft B, which passes through the bed-plate D, is attached to and turns the mould-wheel C. The mould-wheel is a heavy cast-iron wheel, made thick enough at the rim to permit openings to be formed vertically through it of the size of a brick. These rectangular openings are formed in succession around the entire rim, and in each is fitted neatly a follower, F, having a stem, $F^1$, projecting downward through guide plates $F^2$ fastened to the solid portions of the rim of the wheel. A flange, $C'$, projects from the periphery of the wheel a little distance below its upper edge. The bed-plate D is a heavy plate of cast iron, resting upon suitable supports, which carries the entire mechanism. It covers the entire mould-wheel except where cut away upon the sides to show the rim of the wheel. The end $D^2$ opposite the pug-mill is raised, as shown in fig. 1, for purposes which will be explained. The cylinder of the pug-mill A rests upon a band, $A^4$, which may be cast separately from and bolted to the bed-plate, or it may be cast as a part thereof. A curved opening is formed in the bed-plate under the pug-mill and immediately above the line of moulds in the rim of the mould-wheels. The curve of this opening is an arc of a circle of the same radius as that of the mould-wheel. From this opening, and upon the same curve, extends a tubular aperture, $D^1$, over the line of moulds, and in it is placed a plate, E, hinged at the top thereof nearest the pug-mill, and inclined so as to bear upon or in very close proximity to the upper face of the rim of the mould-wheel, the end bearing against the adjusting set-screw $E'$, by which its position is regulated. As the clay is pressed down by the paddles $A^3$, it will be forced into the moulds, and also fill the space between the mould-wheel and the adjustable press-plate E, the action of the revolving wheel will closely compress the clay between it and the inclined press-plate, and fill thereby the moulds as they successively pass under the curved opening and tubular extension thereof. G is a wheel, turning freely upon the shaft $G^1$, one end of which is fastened to the central block L, and the other to a vertical rod, $G^2$, passing through the bed-plate D, and having on the upper end a nut, by which it may be raised or lowered for the adjustment of the height of the wheel D. As the mould-wheel revolves the ends of the stems $F'$ of the follower F will be successively brought against the upper part of the wheel G, and, in passing upwards over the same, force up the followers and compress the clay in the moulds against the press-plate E. After the moulds are thus filled, they pass from under the press-plate, and the clay projecting from their upper surface is shaved off by the edge of the adjustable knife K, secured to the bed-plate by a set-screw passing through a slot in the vertical flange to which the horizontal plate, forming the knife, is attached. After the moulds have passed under the knife, the stem $F'$ of the followers will strike against an inclined plane, M, resting upon suitable supports, by which the followers will be forced upwards, lifting the bricks out of the moulds under the raised portion $D^2$ of the bed-plate, which is here carried up for the purpose. When the bricks have been lifted from the moulds, as they pass the part of the bed-plate cut away on the side of the machine, they are to be lifted off and carried away. The portion of the way M under this part of the wheel is horizontal, and it begins to decline immediately after passing this part, so that, when the brick has been removed, the follower may fall as it passes under the pug-mill, opening the mould for the reception of the clay again. The shaft B and the mould-wheel C are carried upon wheels H, which are placed under the flange C′. These wheels turn freely upon shafts $H^1$, which are sustained at one end upon bearings in the block L, and at the outer end by the rods $H^2$ passing through the bed-plate, and suspended by nuts $H^3$, for the purpose of adjusting them to the wheel. To prevent any lateral motion in the mould-wheel C, an adjustable guide-plate, I, is attached to the under side of the bed-plate, by sets of screws passing through slots in the guide-plate, so as to permit the latter to be kept in contact with, or in very close proximity to, the periphery of the mould-wheel immediately over the flange C′. A convex plate, I, is in like manner attached to the bed-plate within the rim of the mould-wheel.

What I claim, and desire to secure by Letters Patent, is—

1. Adjustably suspending the mould-wheel C from the bed-plate upon wheels H, upon which it revolves substantially as set forth.

2. The combination of the mould-wheel C, and pug-mill A, with a bed-plate, C, having a curved lineal opening under the pug-mill and over the moulds, substantially as described.

3. A curved tubular extension, $D^1$, leading from the bottom of the pug-mill, over the rim of the mould-wheel, through which the clay is fed to the moulds, substantially as set forth.

4. The inclined adjustable press-plate E, placed in the tubular extension $D^1$, in combination with the mould-wheel C.

5. The combination of the press-plate E, mould-wheel C, followers F, and wheel G, substantially as and for the purpose set forth.

6. Adjustably suspending the wheel G from the bed-plate D by rods $G^2$, substantially as and for the purpose set forth.

7. The combination of the mould-wheel C, bed-plate D, and the adjustable packing rings I and I′ attached thereto, substantially as set forth.

8. The combination of the adjustable press-plate E, and adjustable knife K, having a horizontal blade, substantially as set forth.

In testimony whereof I have signed my name to this specification before two subscribing witnesses.

PORTER L. SWORD.

Witnesses:

R. MASON,

JOHN D. BLOOR.